3,303,102
PRODUCTION OF DEXTROSE
Frederick C. Armbruster, La Grange, and Robert L. Bruner, Hinsdale, Ill., assignors to Corn Products Company, New York, N.Y., a corporation of Delaware
No Drawing. Filed Aug. 31, 1964, Ser. No. 393,418
4 Claims. (Cl. 195—31)

This invention relates to the treatment of glucamylase-containing enzyme preparations and the use of such preparations in the hydrolysis of starch. More particularly, this invention relates to an improved process for increasing the glucogenic potency of glucamylase-containing enzyme preparations by selectively reducing the transglucosidase activity contained therein by temperature and pH control, and to the use of these enzyme preparations in the conversion of starch or starch conversion liquors to hydrolyzates which contain exceptionally high yields of dextrose.

Glucamylase is an enzyme that is particularly well suited for the conversion of amylaceous materials to dextrose. Glucamylase occurs in enzyme mixtures derived from the cultivation of certain microorganisms, particularly members of the Aspergillus and Rhizopus genera. Similar types of enzymes have also been referred to in the literature as amyloglucosidase, gammaamylase, and maltase.

Generally other carbohydrates such as alpha-amylase and transglucosidase are also present in glucamylase preparations. Alpha-amylase assists in the conversion of starchy materials to dextrose by randomly splitting the α-1,4 linkages of the large carbohydrate molecules to yield smaller molecules, thereby furnishing glucamylase with readily available substrate. In contrast, transglucosidase catalyzes the synthesis of certain α-1,6 linked oligosaccharides, particularly isomaltose, during the conversion of starch to dextrose. These oligoosaccharides are not readily hydrolyzed to dextrose by glucamylase; therefore consumption of dextrose by this synthetic route seriously detracts from the yields of dextrose otherwise obtainable. Consequently, the elimination of transglucosidase from glucamylase preparations facilitates the conversion of amylaceous materials to maximum yields of dextrose.

Several patents have issued in recent years concerned with procedures for reducing the transglucosidase content of glucamylase-containing enzyme preparations. These patents may be arbitrarily divided into two classes based on the means by which the elimination of transglucosidase is accomplished.

In the first class may be grouped the processes in which special cultures are used to produce glucamylase. These cultures are unique in that they produce glucamylase that is relatively free from transglucosidase. U.S. Patents 3,012,944 and 3,039,936 are representative of the patents in this group. A disadvantage to this approach is that frequently the cultures of choice produce glucamylase in relatively poor yield. Therefore their use is commercially unattractive, elimination of transglucosidase notwithstanding. Or, if the glucamylase yields are in a practical range, sufficient transglucosidase still remains in the enezyme mixtures to preclude the attainment of maximum dextrose yields.

In the second group of processes, the enzyme producing cultures are selected primarily on the basis of high glucamylase yields. The glucamylase preparations thus obtained invariably contain deleterious amounts of transglucosidase. This is then remedied by treating the enzyme preparations with one or more refining agents which by precipitating or complexing transglucosidase, effectively remove it from the enzyme mixture. U.S. Patents 3,042,584, 3,047,471, 3,067,108 and 3,108,928 are examples of the patents in this group. However, there are certain disadvantages inherent in this approach also. In some processes refining agents are used that are prohibitively expensive. In others the refining agent-transglucosidase complex must be separated from the enzyme mixture in order to obtain the object of the invention. Thus an additional filtration or similar purification step is required. And in other processes both an expensive refining agent and the extra purification step are necessary. Naturally each of these features increases the cost, and detracts from the all-over value of the process.

The present invention covers a superior method for reducing the transglucosidase activity of glucamylase preparations. The use of this procedure results in the conversion of amylaceous materials to maximum yields of dextrose, and at the same time overcomes the disadvantages discussed above which are inherent in prior art processes. The invention offers additional advantages as will become apparent hereinafter.

The present invention shows that when glucamylase preparations are maintained under certain specific conditions of temperature and pH, transglucosidase activity rapidly decreases, presumably due to inactivation, while the glucamylase and alpha-amylase activities remain essentially unchanged. Thus according to this invention it is possible to hold glucamylase preparations at an appropriate pH and temperature for a prescribed length of time, until the transglucosidase has been preferentially inactivated, and thereafter use the transglucosidase-free glucamylase preparation to convert starch or starch hydrolyzates to maximum yields of dextrose.

Glucamylase is produced by several microorganisms when cultivated by known methods. Examples of species which are reported in the literature to be good glucamylase producers include: *Aspergillus niger, Aspergillus phoenicis, Aspergillus awamori, Rhizopus delemar,* and *Rhizopus oryzae*. Although the source of glucamylase is not to be restricted in the practice of this invention, it is preferred to use glucamylase preparations derived from strains with the *Aspergillus niger* group. Certain of these cultures, especially when cultivated under submerged culture conditions, are particularly good sources of glucamylase preparations well suited for the conversion of amylaceous materials to dextrose.

The glucamylase activity of the enzyme preparations can be conveniently determined according to the method described at lines 46—75, column 3; and transglucosidase activity according to the method at lines 5–42, column 4 of U.S. Patent 3,012,944. Alpha-amylase activity can be determined spectrophotometrically by the following procedure. Four milliliters (ml.) of a 1.25 percent soluble starch solution, buffered at pH 3.8 with 0.125 molar sodium acetate, is pipetted into a test tube and equilibrated to 60° C. One ml. of enzyme solution, containing 0.04–0.15 unit of alpha-amylase activity, is mixed with the starch substrate. One ml. samples of the mixture are withdrawn exactly three and thirteen minutes after mixing and the enzyme activity contained therein quenched by immediately transferring the samples to 100 ml. volumetric flasks containing 3.0 ml. of a 0.1 percent iodine solution. After the addition of water to bring the flasks to volume, the optical densities of the diluted samples are determined spectrophotometrically using a 20 mm. light path at 650 mu against a water blank. Enzyme activity is calculated by the following formula:

$$\text{Units of enzyme per ml.} = 0.2303 \log \frac{\text{O.D. 3 minutes}}{\text{O.D. 13 minutes}} \times F$$

where $F$=dilution factor of enzyme preparation.

The differential inactivation may be successfully employed with glucamylase preparations of widely varying levels of purity. For example, it is applicable to whole culture liquors, or to filtrates thereof, or to aqueous solutions of purified preparations such as may be obtained by known acetone or propanol precipitation procedures. Generally, the treatment of aqueous solutions of purified preparations is preferred because this reduces the amount of ash and other impurities to be added to the conversion liquor, which in turn lessens the refining requirements of the liquor.

Transglucosidase may be preferentially inactivated at moderately strong acid levels, i.e., from about pH 1.0–3.5. Outside of this range, the procedure is not particularly useful. Glucamylase and alpha-amylase are rapidly inactivated along with transglucosidase below about pH 1.0. At pH levels higher than about pH 3.5 inactivation occurs at an impracticably slow rate, or if conditions are changed so that inactivation does occur, such as by raising the temperature or by operating at moderately alkaline pH levels, transglucosidase, glucamylase and alpha-amylase are all destroyed at approximately the same rate.

Temperature exerts a pronounced effect on the rate of inactivation. At very low temperatures, i.e. 0.5° C., inactivation is relatively slow. As the temperature of the reaction is raised, the rate increases. At temperatures above about 70° C., glucamylase and alpha-amylase are inactivated at appreciable rates along with transglucosidase.

The composition of the enzyme solution also influences the rate of inactivation. For example, the presence of extraneous (non-enzyme) protein, such as that present in whole culture liquors, retards the inactivation of transglucosidase. This is an additional reason why it is preferred to treat preparations which are relatively pure. In addition, it has been found that the presence of certain amylaceous materials such as starch which has been acid-hydrolyzed to a dextrose equivalent (D.E.) of 16, for example, also buffers the enzymes, particularly glucamylase and alpha-amylase, from inactivation. (Dextrose equivalent refers to the reducing sugar content of the hydrolyzate, calculated as dextrose and expressed as percent by weight of the dry substance present.) Taking advantage of this sparing effect permits one to practice the invention at lower pH levels and/or higher temperatures than would be practicably possible otherwise and at the same time reduces the need for exact reaction times to a significant degree. Thus, performing the inactivation in the presence of low D.E. hydrolyzate, for example, is a useful embodiment of the invention as it increases the flexibility of the procedure considerably.

In accordance with the invention described herein, an aqueous glucamylase preparation is adjusted from its original pH, which is usually in the range of about 4.0–4.5, down to an appropriate acid pH, usually in the range of about 1.5–3.0, and is held at this pH for a predetermined length of time; usually 5–180 minutes, depending upon the composition of the reaction mixture and the temperature at which it is maintained. The temperature should be within the range of about 0 to about 70° C. The preferential inactivation step is terminated by raising the pH of the enzyme solution to about 4.0–6.0 and/or by rapidly cooling it at the end of the reaction time.

The choice of reagents for pH adjustment is not critical. Either organic or mineral acids, or mixtures thereof, may be used in the acidification step as long as there is sufficient dissociation to adjust the pH to the desired level. Hydrochloric, oxalic, sulfuric, nitric and citric acids are among those which are suitable. Similarly, any of several readily available basic reagents may be used to raise the pH at the end of the reaction period. Dilute aqueous solutions of sodium hydroxide or sodium carbonate are among those suitable.

The glucamylase preparations obtained by the process described herein are immediately ready for use in the conversion of amylaceous materials to maximum yields of dextrose following known procedures. Except for the fact that essentially all of the transglucosidase activity originally present has been eliminated, its properties are not unlike those of the original preparation. The advantages of the invention will be apparent from the examples below, which are given for purposes of illustration and are not to be considered limiting.

Example I

This example illustrates the preferential inactivation of transglucosidase activity in an aqueous glucamylase preparation obtained by solvent precipitation. *Aspergillus niger* ATCC 13496 was grown in a fermentor under submerged, aerobic culture conditions on a medium containing 15 percent ground yellow corn and 1.0 percent corn steep liquor dry substance. After 5 days of fermentation, the liquor was filtered to remove the mycelium and other suspended matter. The filtrate was placed in a vessel and agitated. To the agitated material was added 1.5 volumes of 2-propanol per volume of culture filtrate, and thereafter 20 grams diatomaceous-earth filter aid per liter of culture filtrate.

The suspension was filtered and the filter cake resuspended in water and diluted to a volume equal to that of the original culture filtrate, and thereafter again filtered to remove the filter aid. The resulting solution was found to contain essentially all of the glucamylase, alpha-amylase and transglucosidase originally present in the culture liquor. The glucamylase activity was 2.2 units per ml.

The enzyme solution was transferred to a thermoregulated vessel and agitated. When the temperature had equilibrated to 30° C., 1.0 molar hydrochloric acid was carefully added until the pH of the solution reached exactly 1.8. Samples of the reaction mixture were withdrawn at the time intervals indicated in the following table. The reaction was terminated by transferring the samples to vessels which contained sufficient sodium acetate-acetic acid buffer (pH 4.5) to raise the pH of the samples to about 4.0. The samples were analyzed for residual glucamylase, alpha-amylase and transglucosidase activities.

The treated enzyme preparations were employed in the saccharification of partially hydrolyzed starch. A 36 percent by weight suspension of corn starch was acid hydrolyzed to 16 D.E. The thinned starch was adjusted to pH 4.5 and divided into four portions, each of which was maintained at 60° C. The four portions of starch hydrolyzate were dosed with untreated glucamylase or glucamylase which had been held at pH 1.8, in amounts equivalent to 14 units of glucamylase activity per 100 grams of starch dry substance. The liquors were analyzed for D.E. and dextrose content after 72 hours of incubation at 60° C.

| Time at pH 1.8 (minutes) | Residual Enzyme Activity (percent) | | | Conversion of 16 D.E. Starch Hydrolyzate | |
|---|---|---|---|---|---|
| | Glucamylase | Alpha-amylase | Trans-glucosidase | D.E. | Dextrose (percent, d.b.) |
| 0 | 100 | 100 | 100 | 91.5 | 86.1 |
| 10 | 91 | 92 | 56 | | |
| 30 | 91 | 85 | 42 | | |
| 60 | 89 | 82 | 28 | 94.1 | 90.6 |
| 90 | 89 | 96 | 21 | | |
| 120 | 87 | 90 | 14 | 94.0 | 90.4 |
| 180 | 89 | 86 | 10 | 94.0 | 90.4 |

Example II

This example illustrates the preferential inactivation of transglucosidase activity in glucamylase preparations derived from organisms which produce relatively small amounts of transglucosidase. A strain of *A. niger* possessing physiological characteristics identical to *A. niger* ATCC 13497, i.e., the capacity to produce at least about twice as much glucamylase as the best of prior art strains, but relatively less transglucosidase (see U.S. Patent 3,012,-944), was grown under submerged, aerobic culture conditions and its starch hydrolyzing enzymes harvested in a manner similar to that described in Example I. The resulting enzyme solution, which contained essentially all of the glucamylase, alpha-amylase, and transglucosidase activities originally present in the culture filtrate possessed a glucamylase activity of 6.1 units per ml.

The enzyme solution was handled as described in Example I except that the inactivation procedure was carried out at 32° C. and the pH was adjusted to exactly 2.0 by the addition of 6.0 molar hydrochloric acid.

| Time at pH 2.0 | Residual Enzyme Activity (percent) | | | Conversion of 16 D.E. Starch Hydrolyzate | |
|---|---|---|---|---|---|
| | Glucamylase | Alpha-amylase | Trans-glucosidase | D.E. | Dextrose (percent, d.b.) |
| 0 | 100 | 100 | 100 | 94.5 | 91.1 |
| 5 | 94 | 94 | 67 | | |
| 10 | 93 | 93 | 71 | | |
| 15 | 93 | 88 | 71 | | |
| 30 | 97 | 89 | 64 | | |
| 60 | 96 | 93 | 54 | 95.5 | 93.0 |

Example III

This example illustrates the inactivation of transglucosidase activity in the presence of low D.E. starch hydrolyzate and the subsequent conversion of the hydrolyzate to one of high dextrose content. *A. niger* ATCC 13496 was grown in a fermentor under submerged, aerobic culture conditions and filtered as in Example I. A 36 percent by weight solution of 16 D.E. starch hydrolyzate was divided into eight portions, each of which was equilibrated to 60° C. and stirred. *A. niger* culture filtrate was added to the portions of hydrolyzate in amounts equivalent to 16 units of glucamylase activity per 100 grams of starch hydrolyzate dry substance. Seven of the hydrolyzate solutions were carefully adjusted to pH 3.0 with 1.0 molar hydrochloric acid. The liquors were adjusted to pH 4.5 by the addition of 3.0 molar sodium hydroxide after the time intervals shown in the following table. The eighth portion of starch hydrolyzate was adjusted to pH 4.5 directly (0 hours). The liquors were analyzed for D.E. and dextrose content after a total of 72 hours incubation at 60° C.

| Time at pH 3.0 (hours) | Conversion of 16 D.E. Starch Hydrolyzate | |
|---|---|---|
| | D.E. | Dextrose (percent, d.b.) |
| 0 | 91.8 | 86.8 |
| 0.25 | 94.3 | 91.0 |
| 0.50 | 94.3 | 91.0 |
| 1.0 | 95.6 | 93.2 |
| 2.0 | 95.3 | 92.8 |
| 3.0 | 94.4 | 91.2 |
| 4.0 | 93.8 | 90.0 |
| 5.0 | 94.0 | 90.4 |

Example IV

This example demonstrates that the alpha-amylase activity present in glucamylase preparations is not destroyed by acid inactivation. Quite to the contrary, acid-treated glucamylase preparations can be employed to liquefy starch, as well as to convert thinned starch to high yields of dextrose.

*A. niger* ATCC 13496 was grown under submerged, aerobic culture conditions, and its starch hydrolyzing enzymes harvested as described in Example I. A portion of the enzyme solution was treated at pH 1.8, 30° C. for 180 minutes. The remainder of the enzyme solution was untreated. The enzyme solutions were used to liquefy corn starch as follows: A 36 percent by weight suspension of unmodified corn starch was dosed with each of the two enzyme solutions in an amount equivalent to 19 units of glucamylase activity per 100 grams of starch dry substance. The starch suspensions plus enzyme were gradually transferred to vessels equipped with suitable means for agitation and controlled at 78°–80° C. The transfer rate was such that it required about 1 hour to transfer all of each of the suspensions (4000 ml.) to the thermoregulated vessels. Agitation was continued and the temperature was maintained at 78°–80° C. for three additional hours. The thinning operation was terminated by autoclaving the hydrolyzates for 15 minutes at 15 p.s.i. (121° C.). This succeeded in resolubilizing a small amount of starch that remained unreacted and at the same time destroyed any residual enzyme activity.

The alpha-amylase thinned starch hydrolyzates were saccharified by cooling them to 60° C., adjusting them to pH 4.5 and redosing them with the respective enzyme preparations in amounts equivalent to 20 units of glucamylase activity per 100 grams of starch dry substance. The hydrolyzates were incubated at 60° C. for 90 hours, then filtered and analyzed for D.E. and dextrose content.

| Enzyme Treatment | Conversion of Alpha-Amylase Thinned Starch Hydrolyzate | |
| --- | --- | --- |
| | D.E. | Dextrose (percent, d.b.) |
| None | 94.8 | 91.6 |
| 180 minutes at pH 1.8, 30° C | 98.8 | 97.7 |

Example V

This example illustrates that the preferential inactivation of transglucosidase may be accomplished with any of a number of suitable organic or mineral acids, and that the inactivation is not necessarily dependent upon the choice of acid used. *A. niger* ATCC 13496 was grown in a fermentor under submerged, aerobic culture conditions and the enzyme harvested as in Example I. A 36 percent by weight solution of 16 D.E. starch hydrolyzate was divided into twelve portions, each of which was equilibrated to 60° C. and stirred. *A. niger* enzyme was added to the portions of hydrolyzate in amounts equivalent to 16 units of glucamylase per 100 grams of starch hydrolyzate dry substance. The pH of ten of the hydrolyzate samples was carefully adjusted to 3.0 by the addition of 1.0 molar solutions of sulfuric, nitric, citric, formic or oxalic acid as indicated below. After 30 or 60 minutes, the liquors were adjusted to pH 4.5 by the addition of 3.0 molar sodium hydroxide. The eleventh and twelfth portions of hydrolyzate were adjusted to pH 4.5 directly. The liquors were analyzed for D.E. and dextrose content after a total of 72 hours of incubation at 60° C.

| Acid Added | Minutes at pH 3.0 | 72-Hour Conversion Results | |
| --- | --- | --- | --- |
| | | D.E. | Dextrose, percent d.b. |
| Sulfuric | 30 | 94.7 | 91.7 |
| | 60 | 95.4 | 92.7 |
| Nitric | 30 | 94.3 | 91.1 |
| | 60 | 95.4 | 92.7 |
| Citric | 30 | 94.5 | 91.4 |
| | 60 | 95.8 | 93.3 |
| Formic | 30 | 94.9 | 92.0 |
| | 60 | 95.5 | 92.8 |
| Oxalic | 30 | 94.2 | 91.0 |
| | 60 | 94.7 | 91.7 |
| None (control) | None | 91.9 | 87.6 |
| None (control) | None | 91.8 | 87.5 |

Example VI

This example illustrates that the preferential inactivation of transglucosidase may be accomplished at pH values within the range of about 1.0–3.5 at temperatures of about 0°–70° C.

*A. niger* ATCC 13496 was grown under submerged, aerobic culture conditions and the enzyme harvested as in Example I. Following the procedures outlined in Example I, the enzyme was held under the conditions specified in the following table. After treatment, enzyme samples were analyzed for residual activity and used in the conversion of 16 D.E. starch hydrolyzate. The results are presented below:

| Acid | Conditions of Holding | | | Residual Enzyme Activity (Percent) | | | Conversion of 16 D.E. Starch Hydrolyzate | |
| --- | --- | --- | --- | --- | --- | --- | --- | --- |
| | pH | Temp., ° C. | Time (min.) | Glucamylase | Alpha-amylase | Transglucosidase | D.E. | Dextrose, percent d.b. |
| Sulfuric | 1.0 | 2 | 1 | 82 | 95 | 16 | 92.8 | 89.8 |
| Do | 1.0 | 2 | 5 | 71 | 76 | 3 | 93.8 | 91.4 |
| Do | 1.5 | 2 | 60 | 78 | 84 | 4 | 94.2 | 91.5 |
| Hydrochloric | 1.6 | 30 | 1 | 85 | 84 | 34 | 94.4 | 91.1 |
| Do | 1.6 | 30 | 10 | 77 | 72 | 13 | 95.7 | 93.1 |
| Do | 1.8 | 30 | 30 | 90 | 86 | 41 | 94.0 | 90.7 |
| Do | 1.8 | 30 | 60 | 88 | 85 | 25 | 94.3 | 91.0 |
| Do | 1.8 | 30 | 120 | 85 | 79 | 13 | 95.9 | 93.4 |
| Do | 1.8 | 30 | 180 | 83 | 75 | 15 | 94.7 | 91.7 |
| Do | 2.0 | 30 | 180 | 94 | 91 | 62 | 92.8 | 88.9 |
| Sulfuric | 3.0 | 70 | 2 | 84 | 67 | 3 | 95.8 | 93.6 |
| Do | 3.5 | 70 | 10 | 65 | 75 | 40 | 92.4 | 87.9 |
| None | | | | 100 | 100 | 100 | 89.9 | 82.0 |
| Do | | | | 100 | 100 | 100 | 90.3 | 81.9 |

We claim:
1. A process for the selective reduction of transglucosidase activity of a fungal amylase preparation possessing transglucosidase, glucamylase, and alpha-amylase activities, consisting essentially of the single step of treating said amylase preparation in an aqueous medium with acid to obtain a pH between about 1 and about 3 for a period of time not exceeding about 5 hours, to inactivate at least 40% of the transglucosidase enzyme while simultaneously inactivating less than 25% of the glucamylase and alpha-amylase enzymes present.

2. The process of claim 1 wherein the temperature is within the range of about 0 to about 70° C.

3. A process for hydrolyzing starch to dextrose which comprises partially hydrolyzing the starch to reduce the viscosity thereof and thereafter subjecting it to the action of a fungal amylase preparation treated by the process of claim 1.

4. The process of claim 1 wherein the aqueous medium is a starch hydrolyzate.

References Cited by the Examiner
UNITED STATES PATENTS

| | | | |
| --- | --- | --- | --- |
| 3,047,471 | 7/1962 | Hurst et al. | 195—66 |
| 3,067,108 | 12/1962 | Hurst et al. | 195—31 |
| 3,108,928 | 10/1963 | Kathrein | 195—31 |
| 3,117,063 | 1/1964 | Hurst et al. | 195—31 |

OTHER REFERENCES

Kerr, R. W., et al.: Die Starke, October 1951, pages 271–278.

References Cited by the Applicant
UNITED STATES PATENTS

| | | |
| --- | --- | --- |
| 2,967,804 | 1/1961 | Kerr. |
| 3,042,584 | 7/1962 | Kooi et al. |
| 3,101,302 | 8/1963 | Inglett. |

A. LOUIS MONACELL, *Primary Examiner.*

L. M. SHAPIRO, *Assistant Examiner.*